Sept. 19, 1961 H. H. SCHMIEL 3,000,397
VALVE ASSEMBLY
Filed Aug. 24, 1959 2 Sheets-Sheet 1

INVENTOR.
HERBERT H. SCHMIEL
BY
Oberlin, Maky & Donnelly
ATTORNEYS

Sept. 19, 1961 H. H. SCHMIEL 3,000,397
VALVE ASSEMBLY
Filed Aug. 24, 1959 2 Sheets-Sheet 2
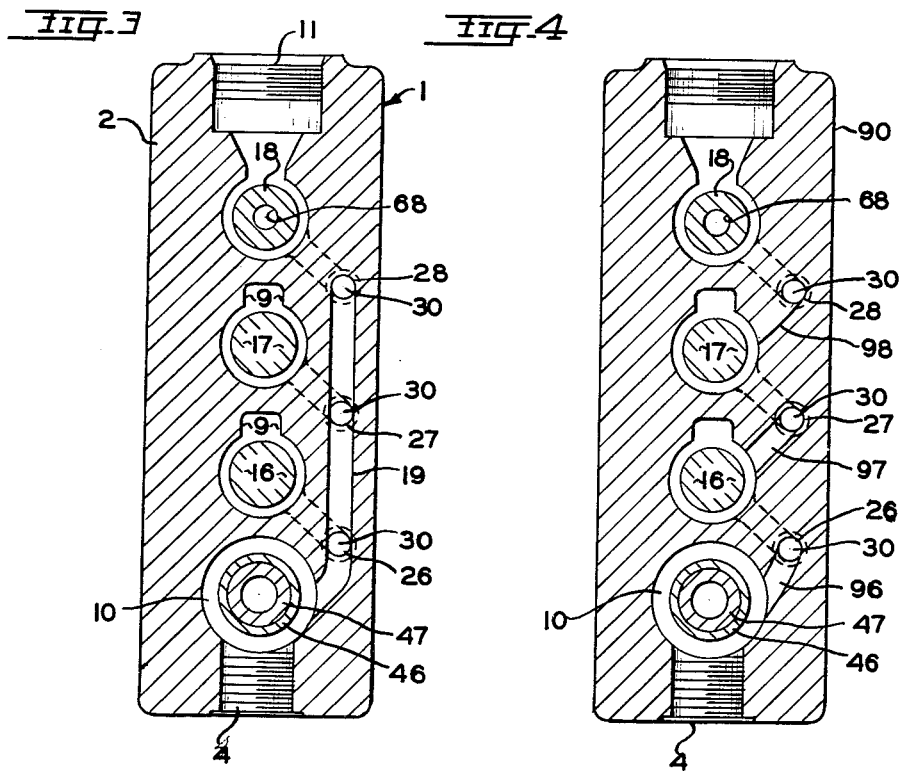
INVENTOR.
HERBERT H. SCHMIEL
BY
Oberlin, Maky & Donnelly
ATTORNEYS

3,000,397
VALVE ASSEMBLY
Herbert H. Schmiel, Willoughby, Ohio, assignor to Parker-Hannifin Corporation, Cleveland, Ohio, a corporation of Ohio
Filed Aug. 24, 1959, Ser. No. 835,489
17 Claims. (Cl. 137—622)

The present invention relates generally as indicated to a valve assembly and more particularly to a control valve assembly adapted for installation in a fluid pressure system for controlling the operation of fluid motors.

A principal object of the present invention is to provide a simplified and efficient form of controlled valve assembly that is characterized by the provision of a unitary housing formed with a pressure inlet port, an outlet or tank port, and service ports for connection to a plurality of fluid motors; and with spool valve bores in which spools are movable to control the supply and return of fluid to and from the respective motors. Said unitary housing is further characterized by its symmetrical arrangement of passages and by the provision of pairs of check valves therein associated with the respective spools and located upstream thereof so as to be automatically effective either to prevent load dropping when the spools are shifted from an operating position to neutral position or vice-versa, or to prevent interflow or back flow of fluid as might otherwise occur when two or more spools are simultaneously disposed in operating position for supplying fluid under pressure to motors operating at different loads. Still further, the unitary housing herein is characterized by the provision of a centrally located by-pass passage that communicates the inlet port with the tank port when all of the spools are in neutral or inactive position, said by-pass being closed upon operation of any one of said spools.

Another object is to provide a control valve of the type described in which there are two or more spools, each controlling flow of fluid to and from an associated fluid motor and in which there is a pair of check valves associated with each spool valve for preventing load dropping or back flow of fluid as aforesaid.

Another object of this invention is to provide a multiple spool type control valve assembly as aforesaid in which the symmetrical design of the housing permits end for end reversal of any or all of the spools so that the actuating portions thereof may be disposed at either end of the valve housing.

Another object of this invention is to provide a multiple spool valve assembly in which the spool valve bores in the housing are parallel to one another and in which the housing is formed with a relief valve bore and with pairs of check valve bores all disposed parallel to the spool valve bores to thus provide a simplified housing construction with respect to ease of assembly and economy of manufacture. In addition, the relief valve assembly fitted into the aforesaid relief valve bore of the housing is reversible end for end so that the spring adjusting mechanism thereof may be disposed at either end of the housing, as desired.

Another object of this invention is to provide a multiple spool valve assembly of the character indicated in which the spool valves have associated therewith unique forms of indexing or detent mechanisms for yieldably holding the spools in their neutral and operating positions.

Still another object of this invention is to provide a novel form of valve housing which by way of a simple coring change may be converted from parallel to parallel-series operation of a plurality of fluid motors. That is, for example, plural motors may be operated independently or simultaneously by appropriate manipulation of the respective spools (parallel operation) or plural motors may be selectively operated by their respective spools one at a time only (series-parallel operation). As well-known in the art, multiple spool type valves may be arranged for series operation, namely, the motors may be operated concurrently with the spools arranged so that the discharge from an upstream motor is utilized for actuating a downstream motor.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of a few of the various ways in which the principle of the invention may be employed.

Figure 1:
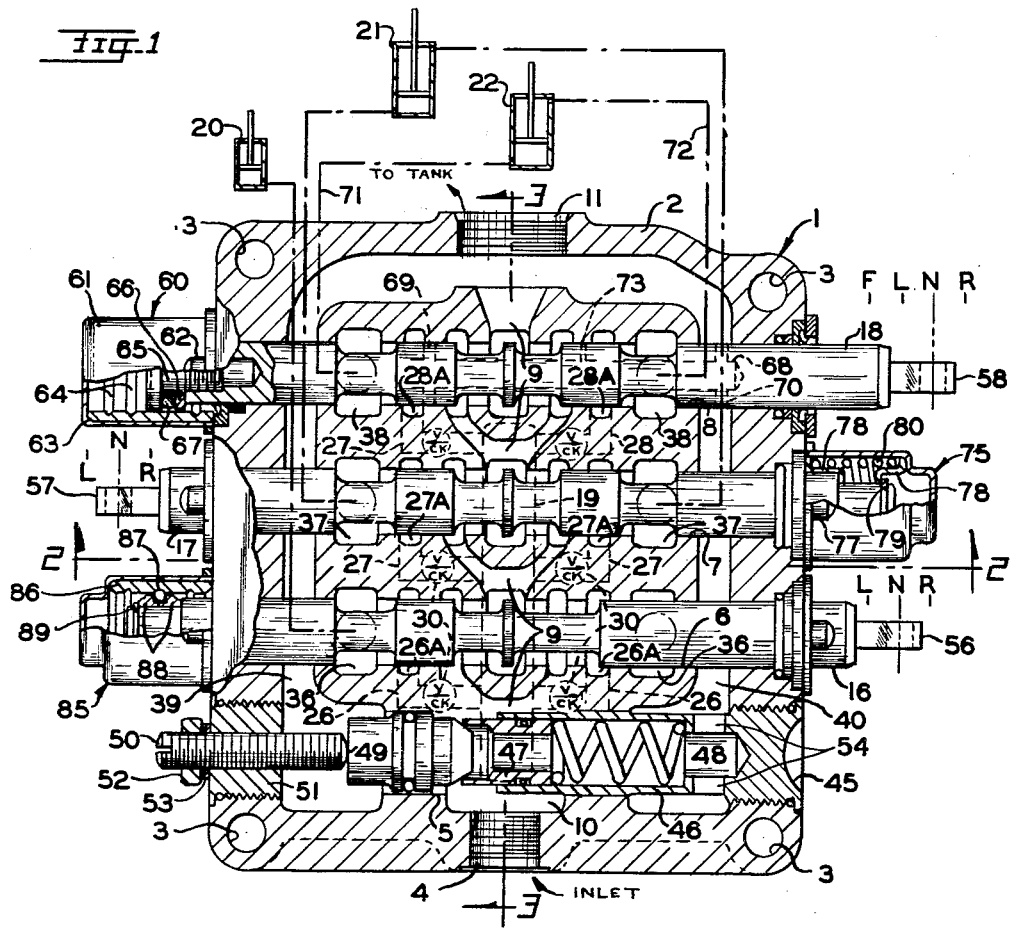
FIG. 1 is a cross-section view through the valve assembly in a plane containing the axes of the spool valve and relief valve bores, the aforesaid pairs of check valves associated with the respective spool valves being shown schematically for sake of simplification of the drawing and for facilitating a clearer understanding of the nature of this invention.

FIG. 3 is a cross-section view taken substantially along the line 3—3, FIG. 1 showing a parallel coring arrangement of the housing whereby any one of the several spools may be actuated to operate its associated fluid motor or two or more spool valves may be actuated simultaneously to operate the associated fluid motors; and, FIG. 4 is a cross-section view similar to FIG. 3 except showing the coring of the housing to provide for series-parallel operation whereby only one of the spools can be actuated at any given time.

Figure 2:
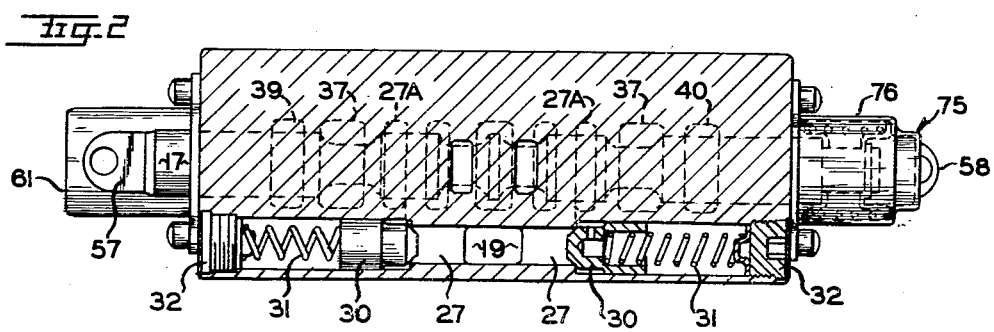
FIG. 2 is a cross-section view taken substantially along the line 2—2, FIG. 1, and showing in detail the structure of one pair of such check valves, it being understood that the pairs of check valves associated with the other spool valves are of the same or similar structure.

Referring now more particularly to the drawing, the valve assembly 1 herein shown in FIGS. 1 to 3 comprises a unitary valve housing 2 formed with mounting holes 3 by which it may be secured in place and further formed with a central pressure inlet port 4 which intersects the relief valve bore 5. Herein the housing 2 is formed with three parallel spool valve bores 6, 7, and 8 which are parallel to the relief valve bore 5.

Extending crosswise of the spool valve bores 6, 7, and 8 and intersecting the same, is a by-pass passage 9 which, at one end, communicates with the inlet chamber 10 and at the other end with the tank port 11 formed in the housing 2, this arrangement being such that when the spools 16, 17, and 18 in the respective bores 6, 7, and 8 are in neutral position fluid freely flows through the by-pass passage 9 from the inlet port 4 to the tank port 11, and such that when any one or more of the spools 16, 17, and 18 are actuated to an operating position, the by-pass passage 9 is blocked thereby so that pressure will build up in the inlet trunk passage 19 to supply fluid under pressure to actuate one or more of the fluid motors 20, 21, and 22 as the case may be.

The by-pass passage 9 is disposed to extend through the middle of the valve housing 2, and as clearly shown in FIG. 1, the by-pass passage 9 is of branched or "wishbone" form so as to intersect the respective spool valve bores 6, 7, and 8 at two places on either side of the narrow middle land of each spool 16, 17, and 18 to thus afford a pressure balanced arrangement as well-known in the art.

Intersecting the inlet trunk passage 19 are pairs of feed passages 26—26, 27—27, and 28—28 which intersect the respective spool valve bores 6, 7, and 8 at regions straddling the branches of the by-pass passage 9 to thus provide pairs of high pressure supply passages 26A, 27A, and 28A.

As schematically shown in FIG. 1, each feed passage 26—26, 27—27, and 28—28 from the inlet trunk passage 19 has a check valve 30 therein arranged to prevent back flow of fluid from the associated high pressure supply passage 26A, 27A, or 28A into the inlet trunk passage 19.

As shown in detail in FIG. 2, each check valve 30 is urged to feed passage closing position by means of a spring 31 which is compressed between the check valve 30 and an abutment plug 32 screwed into the valve housing 2.

Straddling the respective high pressure supply passages 26A, 27A, and 28A of each spool valve bore 6, 7, and 8 are a pair of service ports and passages 36—36, 37—37, and 38—38 which, in the case of double acting fluid motors 21 and 22, are adapted to be connected to the cylinder ports at the ends of the latter, whereby the pistons therein may be moved in one direction or the other by conducting fluid under pressure into one end of the respective cylinders and through one service port and returning the displaced fluid from the other end to the tank via the other service port.

Straddling the aforesaid service ports 36—36, 37—37, and 38—38 and common to all of the spool valve bores 6, 7, and 8, are the branch return passages 39 and 40 which lead from the relief valve bore 5 to the tank port 11 of the housing 2.

From the foregoing it can be seen that the centerline of the by-pass passage 9 coincides with the centerline of the valve housing 2 and that the pairs of by-pass branches, high pressure passages 26A, 27A, and 28A, service ports 36, 37, and 38, and return passages 39 and 40 are symmetrically arranged with respect to the centerline of the housing 2. As to be presently described, this makes possible the end for end reversal of the spool valves 16, 17, and 18 and also makes possible the use of different types of spool valves as may be required for different installations. It is to be understood that the housing 2 may be provided with any desired number of spool valve bores and that the spool valves may be of the same or different type. By way of example, there is shown a three-way pool 16, a conventional four-way spool 17, and a four-way, four position spool 18 having a "Float" position in addition to the usual three positions, namely, "Neutral," "Raise," and "Lower."

With reference to the relief valve assembly 45, the relief valve bore 5 in the housing 2 is symmetrical about the centerline of the housing so that the parts thereof may be reversed end for end. Screwed into one end of the relief valve bore 5 is the relief valve guide member 46 in which the tubular valve member 47 is slidable, a compression spring 48 being compressed between a shoulder of the guide member 46 and the end of the valve member 47. Slipped in from the other end of the relief valve bore 5 is the relief valve seat member 49 which is in the form of a plug against which the adjusting screw 50 bears to vary the compression of the spring 48, the adjusting screw 50 being threaded into a bushing 51 which is screwed into the other end of the relief valve bore 5. The threads of the bushing 51 and of the guide member 46 are of the same size. The adjusting screw 50 is locked in place by means of the lock nut 52, and a sealing washer 53 is employed between the lock nut 52 and the end of the bushing 51. Accordingly, whenever the fluid pressure in the inlet port 4 exceeds a predetermined value for which the spring 48 has been set, the relief valve member 47 will be forced away from the seat member 49, whereby the fluid will flow through the relief valve member 47, through the guide member 46, and through the apertures 54 into the return branch 40. As aforesaid, these relief valve parts may be assembled in reverse position, in which case the fluid will be relieved through the left-hand return branch 39.

Referring now to the spool valves 16, 17, and 18, and first to the four-way, four position spool 18, the same is of hollow form provided with an actuating portion 58 at one end and a spring detent mechanism 60 at the other end. The end portions of the spool valve extend through suitable packing assemblies mounted in the housing 2. In this case, the detent mechanism 60 comprises a cap member 61 which is secured by screws 62 to the valve housing 2 and which has therewithin a sleeve member 63 formed with a plurality of annular grooves 64 axially spaced apart to correspond with the four positions of this spool 18. Screwed into that end of the spool 18 is a shouldered screw 65 which, together with the ring 66, defines a peripheral groove in which is disposed a split resilient ring 67 which is adapted to engage in any selected one of the grooves 64 upon axial movement of the spool 18.

The spool 18 is shown in FIG. 1 in its neutral position N wherein fluid can freely flow past the narrow center land from the branches of by-pass 9 to the tank port 11. In this position of the spool 18, the high pressure supply passages 28A are blocked by a pair of lands of said spool, whereby high pressure fluid cannot flow to either of the two service ports 38. The next pair of lands serves to block communication between the service ports 38 and the return branch passages 39 and 40 and, therefore, the piston in the motor 22 is locked against movement up or down.

When the spool 18 is shifted to the right from neutral position N to the position R, the center land and the land to the left thereof, block the by-pass passage 9 so that pressure may build up in the feed passages 28. In this position of the spool 18, the left supply passage 28A is communicated with the left service port 38, whereby the high pressure fluid is effective to raise the piston in motor 22. The fluid displaced from the upper end of the cylinder is communicated with the tank port 11 via the right service port 38 and the right tank passage branch 40. Now, as the spool 18 is shifted from position R to position N, it is conventional practice to open the by-pass 9 just an instant before the communication between the left supply passage 28A and left service port 38 is closed and, therefore, except for the provision of the left check valve 30 in the left feed passage 28, the piston in the cylinder 22 may drop slightly. The check valve 30 thus prevents such load dropping.

When the spool 18 is shifted from neutral position N to the left to the lower position L, the by-pass passage 9 is closed as before by the center land and the land to the right thereof and the right supply pasage 28A is opened to the right service port 38, whereby fluid pressure builds up in the feed passages 28 and flows through the right check valve 30 into the right supply passage 28A to thus urge the piston in the cylinder 22 in the opposite direction and again, as before, as the spool 18 is shifted from position L to position N, the right check valve 30 will prevent load shifting.

With respect to the float position F of the spool 18, the service ports 38 are communicated with each other through the spool bore 68 and openings 69 and 70 and, therefore, the piston in cylinder 22 with its load "floats" in either direction. The fluid displaced from the head end of the cylinder 22 flows through the line 71 into the left service port 38 and through the openings 69 and spool bore 68 and openings 70 to the right service port 38, and thence by way of the line 72 to the rod end of the cylinder 22. Because the displacement of the head end is greater than that of the rod end, the excess fluid will be returned to the tank port 11 by way of the spool orifice 73 which is at that time in communication with the tank port 11 via the by-pass passage 9. The orifice 73 is of such size that a slight back pressure is built up to prevent too rapid movement of the piston of cylinder 22, whereby the rod end of the cylinder will always remain filled with fluid ready for immediate power actuation by shifting the spool 18 from the float position F to the adjacent position L. A detailed discussion of such four position, four-way spool valve having a so-called "float" position is discussed in detail in the copending application of Hugh J. Stacey, Serial No. 812,687, filed May 12, 1959.

By way of example only, the center spool 17 is of the conventional spring centered, four-way type which has an actuating portion 57 at one end and a spring centering mechanism 75 at the other end. Said spring centering mechanism 75 comprises a cap 76 secured by screws 77 to the valve housing 2. Inside the cap 76 are opposed spring followers 78, one of which engages the housing 2 and a shoulder of the spool 17 and the other of which abuts the cap 76 and another shoulder of the spool valve provided by the snap ring 79 or the like. Compressed between these followers 78 is a spring 80. As evident, when the spool 17 is moved to the right, the left follower 78 moves therewith to compress the spring, whereupon, when the spool actuating force is released, the spring 80 will, through the left follower 78, urge the spool 17 to the neutral position N as shown in FIG. 1. On the other hand, when the spool 17 is shifted toward the left, the right follower 78 will be urged toward the left to compress the spring 80 and when the actuating force on the spool 17 is released, the spring 80 will return the right follower 78 toward the right thereby pulling the spool back to neutral position N.

As aforesaid, the middle spool 17 is of the conventional four-way type including a narrow center land which, in the neutral position N, permits fluid to flow through the by-pass passage 9 from the inlet chamber 10 to the tank port 11. When the spool 17 is shifted to the right to position R, the left supply passage 27A is communicated with the left service port 37 and the right service port 37 is communicated with the right tank branch passage 40, whereby the piston in the cylinder 21 will be up as shown in FIG. 1. When the spool 17 is shifted from the neutral position N to the left to position L, the right supply passage 27A is communicated with the right service port 37 and the left service port 37 is communicated with the left tank branch passage 39, whereby the piston in the cylinder 21 will be moved down as shown in FIG. 1. Again, as before, the check valves 30 in the feed passages to the supply passages serve to prevent load dropping.

Finally, by way of example only, the spool 16 at the bottom is of the three-way type including an actuating portion 56 at one end and a three position detent mechanism 85 at the other end, said detent mechanism being generally of the same construction as described in relation to the detent mechanism 60 for the top spool, that is, the mechanism 85 includes an internally grooved sleeve 86 into the grooves of which the resilient ring 87 is adapted to snap to retain the spool 16 in any one of three different positions viz, "L," "N," and "R." The ring 87 is retained in a groove formed by rings 88 held by snap ring 89 on the end of the spool 16. This three-way spool 16 is shown in its neutral position wherein fluid flows through the by-pass passage 9 and around the narrow center land. When the spool 16 is shifted to the right to position R, the by-pass 9 passage is blocked by the center land and the land to the left thereof, and communication is opened between the left supply passage 26A and the left service port 36, whereby the piston in single acting cylinder 20 is raised, fluid flowing through the check valve 30 in the left feed passage 26 from the inlet trunk passage 19 to the left supply passage 26A. When the three-way spool 16 is shifted to the left to position L from neutral position N, the by-pass passage 9 remains open by reason of the wide spacing of the center land from the right land, and the left service port 36 is communicated with the left tank branch passage 39, whereby the piston and the load thereon may descend by gravity in cylinder 20. In this particular case, the check valve 30 in the right feed passage 26 may be dispensed with and, of course, the right service port 36 will be closed as with a suitable plug, since in the case of a single acting cylinder, only one service port is used. However, if the three-way spool 16 is reversed end for end, then the three-way cylinder port will be connected to the right service port 36 and the left service port 36 will be plugged, whereupon the right check valve 30 will be required to prevent the load dropping effect mentioned in connection with the other two spools 17 and 18.

In the parallel arrangement shown in FIGS. 1 to 3, the three pairs of check valves 30 associated with the feed passages 26, 27, and 28 for the respective spools 16, 17, and 18, have the further function of preventing interflow or back flow of fluid when a plurality of spool valves are simultaneously in operating position. Thus, when plural fluid motors are simultaneously actuated, and operate under different loads, the fluid from a highly loaded motor will not back flow to a motor operating at a lower load. The check valves 30 prevent such back flow or interflow between motors that are simultaneously actuated.

In FIG. 4 is shown a housing 90 cored to provide a series-parallel arrangement in which the by-pass 9 leads from inlet chamber 10 to the tank port 11 and traverses the bores for spools 16, 17, and 18 as in FIGS. 1–3. However, in FIG. 4 the inlet trunk 19 is omitted and instead the pairs of feed passages 26, 27, and 28 lead from the upstream portions of the by-pass 9 of the respective spools 16, 17, and 18 to the respective high pressure supply passages 26A, 27A, and 28A. Thus, in FIG. 4 it is possible to actuate only one spool valve 16, 17, or 18 at a time because the shifting of any spool cuts off the flow to all spools downstream thereof. In this case, the inlets 96, 97, and 98 to the respective feed passages 26, 27, and 28 connect directly to the by-pass passage 9 upstream of the respective spools 16, 17, and 18. The check valves 30, of course, yet have the function of preventing load dropping as explained in connection with FIGS. 1 to 3.

It is to be understood that the housing 2 or 90 may readily be modified for series operation as disclosed for example, in the application of Robert B. Olsavsky, Serial No. 608,303, filed September 6, 1956, wherein the operation of one spool controls operation of the associated motor and wherein the actuation of a downstream spool controls actuation of its associated motor by the return fluid from the upstream motor being connected with a supply passage of the downstream spool.

From the foregoing description of the present invention it will be evident that the machining of the valve housing 2 or 90 is greatly simplified by reason of the symmetrical arrangement of the spool valve bores 6, 7, and 8 and, of course, persons skilled in making of cores and in foundry practice will recognize the advantages of the present invention in that "paste-on" cores are either eliminated entirely, or reduced to a minimum. Moreover, machining of the housing 2 or 90 is greatly facilitated by the provision of the parallel spool valve bores 6, 7 and 8, the parallel feeder passages 26, 27, and 28 for the pairs of check valves 30 which are also parallel to the spool valve bores 6, 7, and 8, and the relief valve bore 5 which, likewise, is parallel to the feeder passages 26, 27, and 28 and the spool valve bores 6, 7, and 8, whereby such bores may be readily formed with a multiple drilling unit, or may be drilled by single drills while the housing is mounted on an indexing table.

Other modes of applying the principle of the invention may be employed, change being made as regards the details described, provided the features stated in any of the following claims, or the equivalent of such, be employed.

I therefore particularly point out and distinctly claim as my invention:

1. In a multiple spool valve assembly, the combination of a housing formed with an inlet port, an outlet port, a plurality of parallel spool valve bores, a bypass passage intersecting said bores and extending from said inlet port to said outlet port, pairs of supply passages intersecting the respective bores and leading to the latter from said inlet port, pairs of service ports intersecting the respective bores and adapted for connection with a corresponding number of fluid motors, and a pair of return passages intersecting said bores and leading therefrom to said outlet port; spool valves axially movable in the respective bores, each spool valve being formed to provide a neutral position whereat fluid flows from said inlet port to said outlet port via said bypass passage and at least one operating position whereat said bypass passage is blocked thereby and whereat one supply passage of the associated pair thereof is communicated with one service port of the associated pair thereof; and a check valve in each supply passage effective to permit flow of fluid in one direction only from said supply passage to said service port.

2. The valve assembly of claim 1 wherein said housing is formed with an inlet trunk passage leading from said inlet port to the respective pairs of supply passages and effective to conduct fluid to the motors when a plurality of spool valves are in operating position at the same time whereby said check valves are effective to prevent interflow of fluid from one motor to another.

3. The valve assembly of claim 1 wherein said bypass passage, pairs of supply passages, pairs of service ports, and said pair of return passages are symmetrically arranged with respect to a transverse center line of said housing intersecting the respective bores whereby said spool valves may be turned end for end in their respective bores.

4. The valve assembly of claim 1 wherein at least one of said spool valves is of the four-way type effective, in said operating position, to conduct fluid from the other service port to one return passage, said four-way spool valve having another operating position effective to conduct fluid from the other supply passage via the check valve therein to the other service port and from said one service port to the other return passage.

5. The valve assembly of claim 1 wherein at least one of said spool valves is of the four-way type effective, in said operating position, to conduct fluid from the other service port to one return passage, said four-way spool valve having another operating position effective to conduct fluid from the other supply passage via the check valve therein to the other service port and from said one service port to the other return passage, the intersections of said bypass passage, said pairs of supply passages, said pairs of service ports, and said pair of return passages being in the same relative positions along the respective bores and said bores being of the same diameter whereby said four-way spool valve may be selectively mounted in any one of said bores to actuate a double-acting fluid motor adapted to be connected to the service ports of the selected bore.

6. The valve assembly of claim 1 wherein at least one of said spool valves is of the four-way type effective, in said operating position, to conduct fluid from the other service port to one return passage, said four-way spool valve having another operating position effective to conduct fluid from the other supply passage via the check valve therein to the other service port and from said one service port to the other return passage, the intersections of said bypass passage, said pairs of supply passages, said pairs of service ports, and said pair of return passages being in the same relative positions along the respective bores and said bores being of the same diameter whereby said four-way spool valve may be selectively mounted in any one of said bores to actuate a double-acting fluid motor adapted to be connected to the service ports of the selected bores; said bypass passage, said pairs of supply passages, said pairs of service ports, and said pair of return passages being further arranged symmetrically with respect to a transverse center line of said housing intersecting the respective bores whereby said four-way spool valve may be turned end for end in any selected bore.

7. The valve assembly of claim 1 wherein at least one of said spool valves is of the three-way type effective, in another operating position, to conduct fluid from said one service port to one return passage; said bypass passage, the other supply passage, the other service port, and the other return passage associated with the bore in which said three-way spool is axially movable being arranged so that when said three-way spool valve is turned end for end and moved to one operating position fluid flows from said other supply passage via the check valve therein to said other service port and so that when said three-way spool valve is moved to another operating position fluid flows from said other service port to said other return passage.

8. The valve assembly of claim 7 wherein the intersections of said bypass passage, said pairs of supply passages, said pairs of service ports, and said pair of return passages are in the same relative positions along the respective bores and said bores being of the same diameter whereby said three-way spool valve may be selectively mounted in any one of said bores to actuate a single acting fluid motor adapted to be connected to one of the pair of service ports of the selected bore.

9. The valve assembly of claim 8 wherein said bypass passage, said pairs of supply passages, said pairs of service ports, and said pair of return passages are further arranged symmetrically with respect to a transverse center line of said housing intersecting the respective bores whereby said three-way spool valve may be turned end for end in any selected bore.

10. In a multiple spool valve assembly, the combination of a housing formed with an inlet port, an outlet port, a plurality of parallel spool valve bores, a bypass passage intersecting said bores and extending from said inlet port to said outlet port, pairs of supply passages intersecting the respective bores and leading to the latter from said inlet port, pairs of service ports intersecting the respective bores and adapted for connection with a corresponding number of fluid motors, and a pair of return passages intersecting said bores and leading therefrom to said outlet port; spool valves axially movable in the respective bores, each spool valve being formed to provide a neutral position whereat fluid flows from said inlet port to said outlet port via said bypass passage and at least one operating position whereat said bypass passage is blocked thereby and whereat one supply passage of the associated pair thereof is communicated with one service port of the associated pair thereof; and a check valve in each supply passage effective to permit flow of fluid in one direction only from said supply passage to said service port; said pairs of supply passages communicating with said inlet port via said bypass passage whereby only one spool valve at a time may be thus moved to operating position.

11. In a multiple spool valve assembly, the combination of a housing formed with an inlet port, an outlet port, a plurality of parallel spool valve bores, a bypass passage including pairs of inlet branches intersecting said bores and intermediate outlet portions also intersecting said bores to provide a passageway for conducting fluid from said inlet port to said outlet port, pairs of supply passages intersecting the respective bores and leading to the latter from said inlet port, pairs of service ports intersecting the respective bores and adapted for connection with a corresponding number of fluid motors, and a pair of return passages intersecting said bores and leading therefrom to said outlet port; spool valves axially movable in the respective bores, each spool valve being formed to provide a neutral position whereat fluid flows from said inlet port to said outlet port via the inlet branches and intermediate outlet portions and at least one operating position whereat said spool valve blocks fluid flow from said inlet branches to said intermediate outlet portion of the associated bore and whereat one supply passage of the associated pair thereof is communicated with one service port of the associated pair thereof; and a check valve in each supply passage effective to permit flow of fluid in one direction only from said supply passage to said service port; said inlet branches, said pairs of supply passages, said pairs of service ports, and said pair of return passages being arranged symmetrically with respect to a center line through said intermediate outlet portions whereby said spool valves may be turned end for end in the respective bores to provide such neutral position and at least one operating position for each spool valve whereat fluid is adapted to flow from said inlet port to the other supply passage of the associated pair thereof via the check valve therein to the other service port of the associated pair thereof.

12. The valve assembly of claim 11 wherein said bores are of the same diameter whereby three-way spool valves may be substituted for four-way spool valves or vice versa.

13. The valve assembly of claim 11 wherein said housing is formed with a relief valve bore that is parallel to said spool valve bores and intersects said inlet port and said pair of return passages; and a relief valve assembly mounted in said relief valve bore to conduct fluid from said inlet port to one return passage in response to the fluid pressure in said inlet port exceeding a predetermined value.

14. The valve assembly of claim 11 wherein said pairs of supply passages have bore portions that are parallel to said bores, said check valves being disposed in such bore portions of said pairs of supply passages.

15. The valve assembly of claim 11 wherein each spool valve has an actuating portion at one end and means at the other end determining such operating position thereof, said means including complemental parts attached to said housing at either end of the respective bores according to the endwise position of said spool valves in said bores.

16. The valve assembly of claim 15 wherein at least one of said means comprises a detent mechanism including a sleeve member formed with an internal annular groove, and resilient means carried by the associated spool valve adapted to engage in such groove to retain said spool valve in operating position.

17. In a multiple spool valve assembly, the combination of a housing formed with an inlet port, an outlet port, a plurality of parallel spool valve bores, a bypass passage intersecting said bores and extending from said inlet port to said outlet port, supply passages intersecting the respective bores and leading to the latter from said inlet port, service ports intersecting the respective bores and adapted for connection with a number of fluid motors, and return passages intersecting said bores and leading therefrom to said outlet port; spool valves axially movable in the respective bores, one spool valve being formed to provide a neutral position whereat fluid flows from said inlet port to said outlet port via said bypass passage and at least two operating positions whereat said bypass passage is blocked thereby and whereat one and the other of two supply passages are selectively communicated with one and the other of two service ports for actuating a double acting fluid motor, and another spool valve being formed to provide a neutral position whereat fluid flows from said inlet port to said outlet port via said bypass passage and at least one operating position whereat said bypass passage is blocked thereby and whereat a supply passage is communicated with a service port; and a check valve in each of the aforementioned supply passages effective to permit the flow of fluid in one direction only from said supply passage to said service port.

References Cited in the file of this patent

UNITED STATES PATENTS

| | | |
|---|---|---|
| 2,247,140 | Twyman | June 24, 1941 |
| 2,775,260 | Drennen | Dec. 25, 1956 |
| 2,848,014 | Tennis | Aug. 19, 1958 |
| 2,873,762 | Tennis | Feb. 17, 1959 |